US006529734B1

(12) United States Patent
Lagneborg et al.

(10) Patent No.: US 6,529,734 B1
(45) Date of Patent: Mar. 4, 2003

(54) BANDWITH SUPPLY DEPENDENT CELL LEVEL

(75) Inventors: Johan Lagneborg, Älvsjö (SE); Johan Rune, Tokyo (JP)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/185,083

(22) Filed: Nov. 3, 1998

(51) Int. Cl.[7] ................................................ H04Q 7/20
(52) U.S. Cl. ....................... 455/452; 455/450; 455/444; 455/449
(58) Field of Search ................................ 455/450, 452, 455/453, 444, 525, 451, 446, 447, 426, 441, 443, 449; 379/56.2; 370/331, 468

(56) References Cited

U.S. PATENT DOCUMENTS

| 5,396,645 | A | * | 3/1995 | Huff | 455/441 |
| 5,524,278 | A | * | 6/1996 | Williams | 455/434 |
| 5,548,806 | A | * | 8/1996 | Yamaguchi | 455/441 |
| 5,572,221 | A | * | 11/1996 | Marlevi | 342/452 |
| 5,623,535 | A | * | 4/1997 | Leung | 455/444 |
| 5,729,531 | A | * | 3/1998 | Raith | 370/252 |
| 5,809,422 | A | * | 9/1998 | Raleigh | 455/449 |
| 5,822,696 | A | * | 10/1998 | Bergkvist | 455/436 |
| 5,937,353 | A | * | 8/1999 | Fapojuwo | 455/444 |
| 5,983,101 | A | * | 11/1999 | Billstrom | 455/426 |
| 6,002,935 | A | * | 12/1999 | Wang | 455/447 |
| 6,084,866 | A | * | 7/2000 | Dorenbosch | 370/331 |
| 6,091,955 | A | * | 7/2000 | Aalto | 455/447 |
| 6,122,291 | A | * | 9/2000 | Robinson | 370/468 |
| 6,212,389 | B1 | * | 4/2001 | Fapojuwo | 455/453 |
| 6,256,500 | B1 | * | 7/2001 | Yamashita | 455/441 |

FOREIGN PATENT DOCUMENTS

| EP | 785 696 A2 | 7/1997 |
| WO | WO 98/46033 | 10/1998 |

OTHER PUBLICATIONS

Sami Tabbane, "Location Management Methods For Third--Generation Mobile Systems," IEEE Communications Magazine, Aug. 1997, pp. 72–78 & 83–84.

* cited by examiner

*Primary Examiner*—Vivian Chin
*Assistant Examiner*—John J Lee
(74) *Attorney, Agent, or Firm*—Nixon & Vanderhye P.C.

(57) ABSTRACT

In a cellular telecommunications system in which a geographic area is divided into a hierarchical cell structure such that geographically small but high bandwidth-available cells are located in geographically larger cells of less bandwidth-availability, mobile station connections are made based on the bandwidth requirements of the mobile stations together with the likelihood of mobility of the mobile station within the cell structure. For mobile stations that have low bandwidth requirements and are highly mobile (such as telephones) the mobile stations are connected to cells at a cell layer having relatively large geographical areas yet low bandwidth-availability. On the other hand, for mobile stations with high bandwidth requirements, the mobile stations are connected to geographically small cells with high bandwidth-availability. In this way, mobile stations with high bandwidth requirements yet low mobility can obtain the high bandwidths needed for their communications, while mobile stations with lower bandwidth requirements yet high mobility can move through the cell arrangement while minimizing the number of required handoffs.

16 Claims, 7 Drawing Sheets

BANDWITH SUPPLY DEPENDENT CELL LEVEL

CROSS REFERENCE TO RELATED APPLICATIONS

This application relates to U.S. application Ser. No. 09/203,326 filed Dec. 2, 1998, entitled "Page Response On Existing Radio Signaling Channel" which is incorporated herein by reference.

FIELD OF THE INVENTION

This invention relates to telecommunications systems, and more particularly to communication systems for mobile terminals.

BACKGROUND OF THE INVENTION

A cellular mobile system consists of several building blocks, the most basic of which include the mobile station, the base station, and the mobile services switching center. The functions of each of these are well known in the art. The mobile station is used by mobile stations to communicate with the cellular system. The types of mobile stations that exist vary widely in range from, for example, hand-held telephones, to laptop computers or other personal communications devices. A mobile station communicates with the cellular system using a radio channel to a base station. Base stations are responsible for communication over the air to and from the mobile stations within its geographic area of assignment. The base station communicates with the mobile services switching center (MSC) which is responsible for all switching functions related to call processing. The MSC communicates with the base stations on one side and with external core networks on the other side.

The cellular network is divided geographically into a plurality of cells defining graphic areas where radio coverage is available. Each cell is serviced by one base station and employs one or several frequencies (depending on traffic load) which are different from the frequencies employed by neighboring cells.

FIG. 1 illustrates an example embodiment of a cell design for the mobile communications system. Each of the circles shown in FIG. 1 is a coverage area for a particular base station, with the base station shown as a dot in the center of the circle. Thus, cells A1, A2, A3, and A4 are geographical coverage areas for the mobile stations moving through them. Respective cells A1, A2, A3 and A4 are geographically defined by the effective air communication distance which the base station associated with the cell can provide. The distance is dependent upon a number of factors, such as the power level of the signal output of the base station and of the mobile stations within the base station cell. The base stations A1', A2', A3', and A4' are shown within their respective cells A1, A2, A3, and A4.

Traditionally, as a mobile station moves within a particular geography, it may move from one geographical cell area to another geographical cell area thus result in a hand-off procedure between the respective base stations of the cells. Thus, for example, when a mobile station is in cell A1 and is engaged in an active call, it is communicating with base station A1'. But, when the mobile station moves from the cell A1 into, for example, cell A2, the base station A1' will hand-off service for the mobile station to the new base station A2'. Ideally, the hand-off procedure is seamless to the user of the mobile station. There are a number of known hand-off techniques which can be employed to improve the mobility and seamlessness of the mobile stations during hand-off procedures.

As one of ordinary skill in the art will understand, each of the cells A1, A2, A3, and A4 have a inherent limitation on the amount of traffic that they can process. Thus, each cell has an associated bandwidth with which it must (ideally) accommodate all of the mobile stations within its geographical area. Once the bandwidth is employed by active mobile stations, no further traffic service can be provided by the base station in a particular cell until one of the active mobile stations concludes its call and thereby releases some bandwidth for other mobile stations. Availability of sufficient bandwidth in respective cells becomes increasingly important as more and more mobile stations are being used within the cellular networks. As a result, the geography of the cell structures (i.e., the amount of coverage area that each particular cell services) is a design factor in creating cellular networks. Thus, the uniformly sized and shaped cells shown in FIG. 1 may not be the norm, since network designers will typically reduce the size of cells in high traffic areas and increase the size of cells in low traffic areas. Still, new and improved techniques for efficiently using the bandwidth available in a cellular network are commercially valuable advances.

SUMMARY OF THE INVENTION

In accordance with the preferred embodiment of the present invention, a geographical area is divided geographically into overlapping layers of differently sized cells. That is, a first layer of cells divides a geographical area into small cell groups and then the same geographical area is divided again into larger, overlapping, cell groups. Still further overlapping layers may be employed in addition to the first two layers. This is generally referred to as a hierarchical cell structure.

In the hierarchical cell structure, the lower layer of cells (the geographically small cells) offer higher bandwidth to the mobile stations within it, while the higher layer cells (the geographically larger cells) offer lower bandwidth availability to the mobile stations in its geography, but provide coverage over a larger geographical area.

Thus, in this hierarchical cell structure, geographically small but high bandwidth-available cells are located within geographically larger cells of less bandwidth-availability.

In the preferred embodiment of the present invention, the bandwidth requirements of a mobile station are taken into account when assigning a cell to the mobile station following a call request. A mobile station sends a bandwidth requirement request with a call request, then the bandwidth request is used to determine whether the mobile station should be assigned to a cell having smaller geography and larger bandwidth availability or to a cell having larger geography and smaller bandwidth availability.

BRIEF DESCRIPTION OF THE DRAWINGS

Other advantages and objects of the present invention will be described in detail with reference to the accompanying drawings, in which.

DETAILED DESCRIPTION OF THE PRESENTLY PREFERRED EMBODIMENTS

Figure 1:
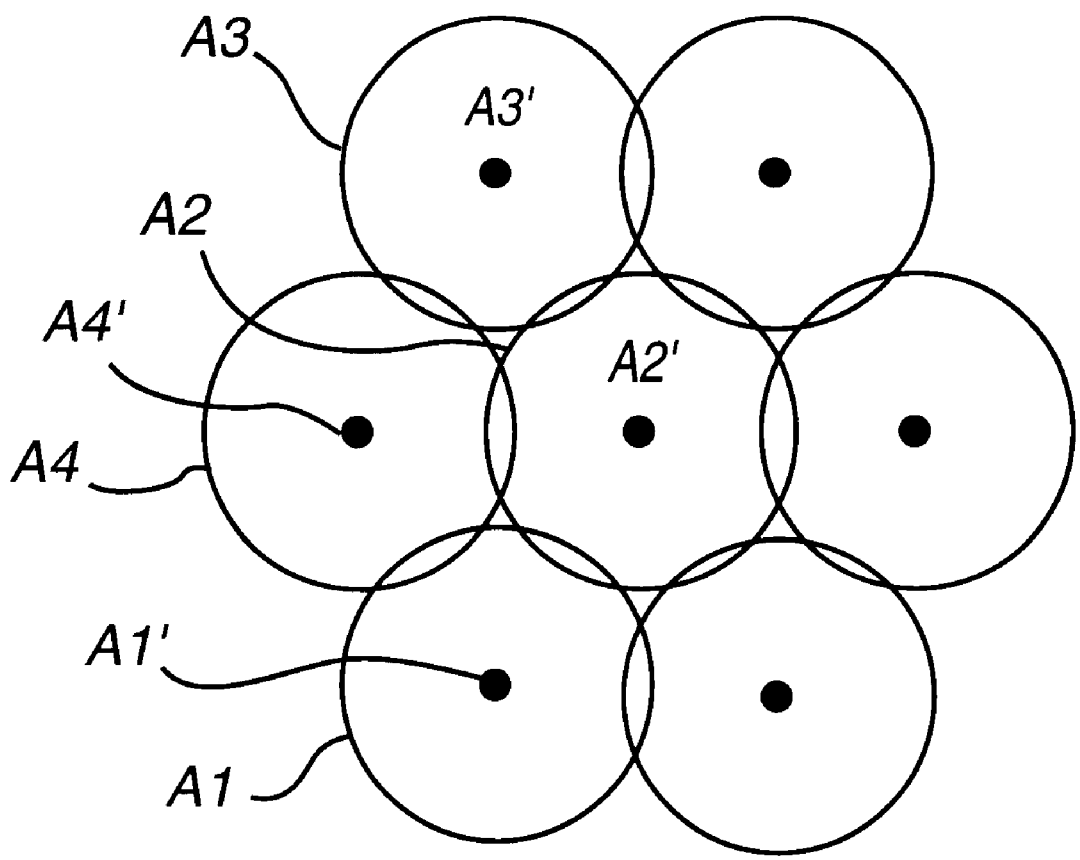
FIG. 1 is a simplified schematic diagram of an example prior art cell structure.

The present cellular system maximizes bandwidth efficiency for many different types of mobile stations, including mobile stations that have relatively narrow bandwidth requirements (such as mobile telephones) and mobile stations that have fairly large potential bandwidth requirements (such as multimedia processing devices). In a network system such as shown in FIG. 1, each mobile station is generally provided with the same narrow bandwidth availability to the cellular system as all other mobile stations. As connections of different bandwidth and traffic capacity requirements are introduced and the demands for wide-band connections come up more frequently, the cellular structure described in FIG. 1 proves less and less adequate.

Figure 2:
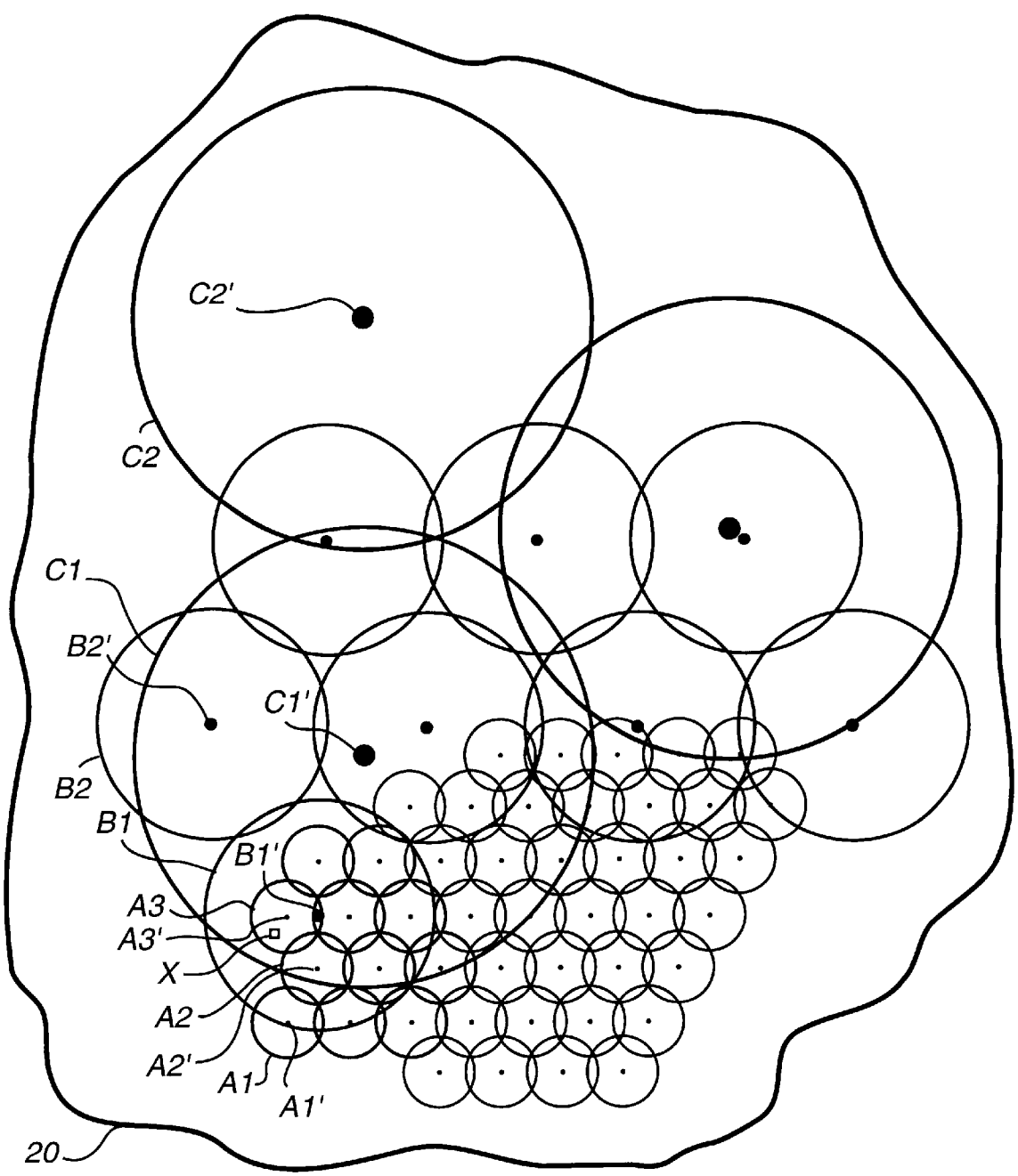
FIG. 2 is an example hierarchical cell structure.

The hierarchical structure of FIG. 2 begins to satisfy some of the requirements for wide-band connections. In the embodiment of FIG. 2, a geographical area 20 is divided into, for example, three different hierarchical levels of cells. The first hierarchical level of cells divides the geographical area 20 into a large number of relatively small cell regions A1, A2, and A3, etc. Each of these cell regions A1, A2, A3, etc. is serviced by, respectively, base stations A1', A2', and A3'. At this level, the cellular structure generally corresponds to that shown in FIG. 1. Alternatively, as the artisan will understand, one base station can serve several cell regions.

However, the geographical region 20 of FIG. 2 includes higher levels of cell structures overlapping the first hierarchical level of cells A1, A2 A3, etc. In the second hierarchical level of cells, the geographical region 20 is divided into moderately sized cells B1, B2, etc. which are serviced by, respectively, base stations B1', B2', etc.

Then, in the example embodiment of FIG. 2, the geographical region 20 is divided into a still further hierarchical level (in this case a third hierarchical level) comprising relatively large geographically arranged cells C1, C2, etc. serviced by base stations C1', C2', etc. Still further layers of hierarchical cells can be added to the three layers shown in FIG. 2.

With the hierarchical structure shown in FIG. 2, when a mobile station is located in the geographical region 20 identified at the point "X," the mobile station can be connected to the cellular network via any one of three different base stations. First, the mobile station at point "X" can be communicating via the base station in cell A3 (the first hierarchical level), the cell B1 (the second hierarchical level) or the cell C1 (the third hierarchical level). When the mobile station at point "X" is communicating in cell A3, it does so with base station A3' at a frequency associated with base station A3'. On the other hand, if the mobile station at point "X" is to communicate via cell B1, it communicates with base station B1' at a frequency associated at B1'. Finally, if the mobile station at point "X" is to communicate via cell C1, it does so by communicating with base station C1' at a frequency associated with base station C1'. Importantly, the mobile station at point "X" has the opportunity to obtain a relatively large bandwidth for its communication if it communicates via cell A3 since cell A3 is geographically small but high bandwidth-available. On the other hand, if the mobile station communicates via cell C1, it will have relatively low bandwidth-availability for its communication yet can travel a large distance (compared to A1 or B1) before requiring any hand-off.

The present invention recognizes the existence of a tradeoff in advantages for the mobile station at point "X." In particular, if the mobile station at point "X" is a high bandwidth requirement device, it has a better chance of obtaining its high traffic capacity requirements from cell A3 than it does from cell C1. On the other hand, if the mobile station is communicating via cell A3, it is relatively limited in its geographical movement without requiring a hand-off procedure from cell A3 to an adjacent cell to which it is moving. In contrast, the mobile station at point "X" can move a relatively large geographical distance in the geographical area 20 if it is communicating in cell C1, without any hand-off procedure. A tradeoff thus exists for the mobile station at point "X" between obtaining high bandwidth communications versus achieving high geographical mobility without requiring hand-off procedures.

Figure 3:
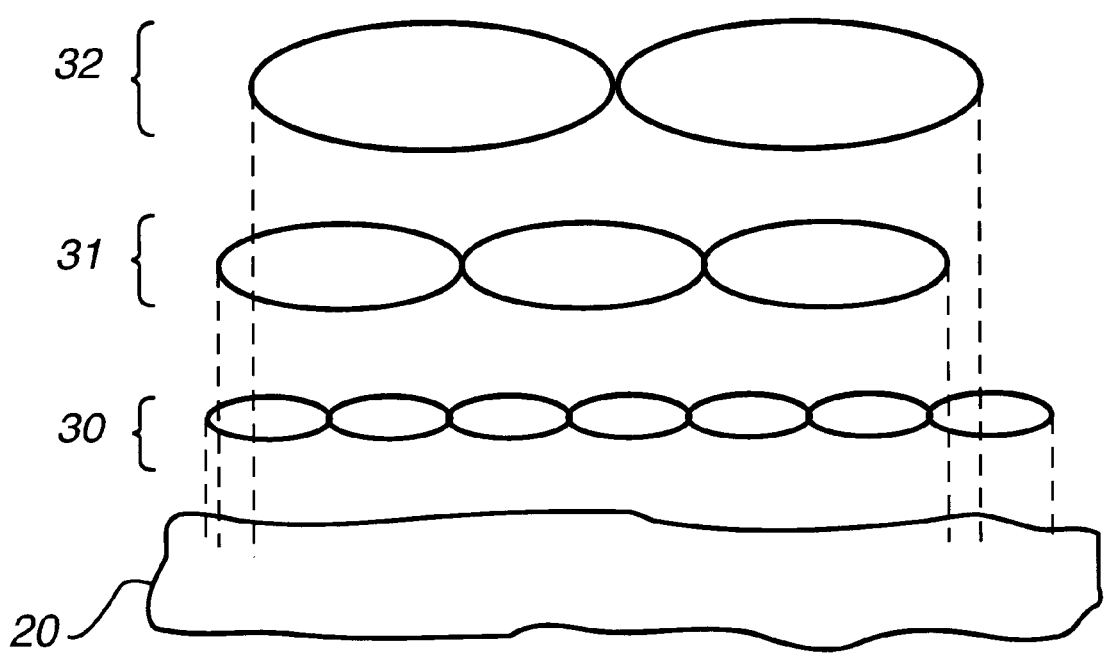
FIG. 3 is another example hierarchical cell structure.

FIG. 3 illustrates the hierarchical levels of cells shown in FIG. 1, in a more simplified format. In FIG. 3, the geographical area 20 has associated with it three hierarchical levels of cells. The first level of cells 30 are geographically small. Thus, each cell in layer 30 must share its fixed bandwidth with a relatively small number of users and thus can provide higher bandwidth to each particular user within its geographical cell area. The cells in layer 31 (the second hierarchical level) are geographically larger and thus provide less bandwidth availability per user than would be expected with respect to the cells in layer 30 (of course, population densities may create exceptions to this expectation). Still firther, the cells in layer 32 (the third hierarchical level) cover still further greater geographical areas and thus generally provide still less potential bandwidth per user than levels 30 or 31. In making the correspondence between the embodiment of FIG. 2 and the embodiment of FIG. 3, the cells A1, A2, A3, etc. would reside in layer 30; B1, B2, etc. reside in layer 31; and the cells C1, C2, etc. reside in layer 32. Of course, the geographical area 20 may be divided into more or less numbers of hierarchical layers than that shown in FIGS. 2 or 3, depending upon the design constraints and benefits desired. Further, although the cells are shown in FIGS. 2 and 3 of uniform shape and size within each hierarchical level, this need not necessarily be the case. That is, the cells in layer 30, for example, may be relatively small geographically, yet be non-uniform with respect to other cells in layer 30. The same can be true for layers 31, 32, etc. In FIGS. 2 and 3, one can appreciate that a mobile station in the geographic area 20 cannot move relatively far before it would leave one of the cells at layer 30, but can move a relatively larger distance before leaving a cell in layer 32.

Figure 5:
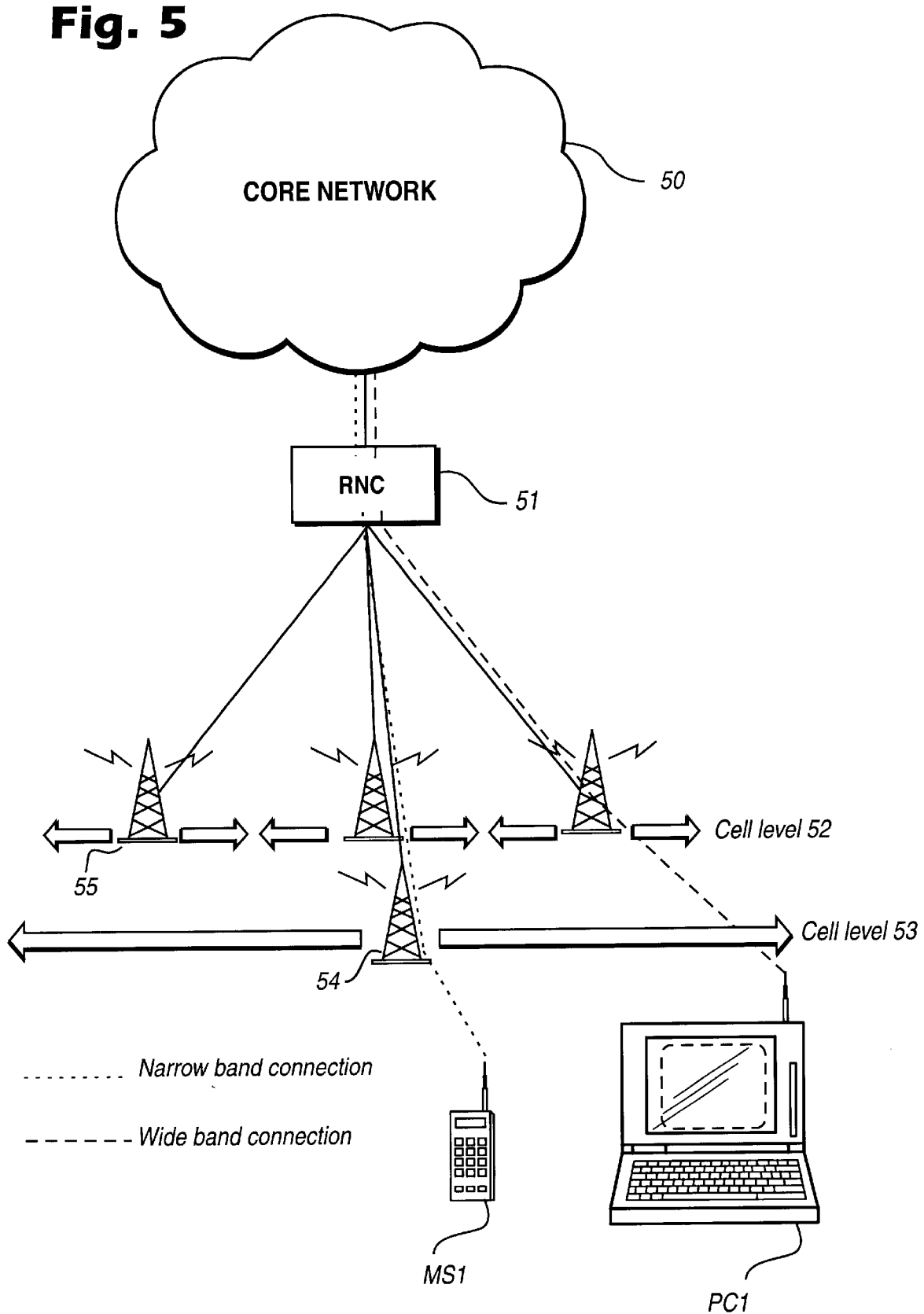
FIG. 5 is a schematic diagram of an example embodiment of the present invention.

The preferred embodiment of the present invention makes call connections in accordance with at least two factors: the bandwidth requirement of the mobile station and the potential mobility of the mobile station. As shown in FIG. 5, two different types of mobile stations are shown, a mobile station telephone (MS1) and a mobile station laptop computing device (PC1). Traditionally, the high bandwidth requirement mobile stations will be laptops (such as PC1) rather than telephones (such as MS1) (although this may not necessarily always be the case).

In addition, the present invention also recognizes that it is more likely that the high bandwidth requirement device (such as the laptop) is more likely to be used by a person who is not moving in the geographical area 20 as compared to a user of a lower bandwidth requirement device (such as a cellular telephone). In any event, as shown in FIG. 5, the high bandwidth requirement device, laptop PC1, communicates with the core network 50 via RNC 51 by communicating with a base station in cell level 52, while telephone MS1 (with a lower bandwidth requirement) communicates at cell level 53. As shown in FIG. 5, the cell level 52 has a greater number of base stations per geographical area than the cell level 53. In this sense, cell level 52 corresponds to, for example, layer 30 of FIG. 3, while cell level 53 corresponds to, for example, layer 31 of FIG. 3. Since the transportation capacity for the frequency band of any base station does not necessarily depend on the size of the cell, the base station 54 (to which the telephone MS1 is communicating) must divide its transportation capacity among a greater number of users than does, for example, base station 55 at cell level 52. Thus, telephone MS1 generally will have available to it less bandwidth availability than will laptop PC1, because telephone MS1 is communicating at a higher level cell structure (at cell level 53) than is laptop PC1 (at cell level 52). Of course, one can see from FIG. 5 that the laptop PC1 cannot move geographically in cell level 52 relatively far before a handoff must occur among the base stations 55 and cell level 52. On the other hand, the telephone MS1 can travel relatively farther geographically in cell level 53 before a hand-off must occur.

Figure 6:
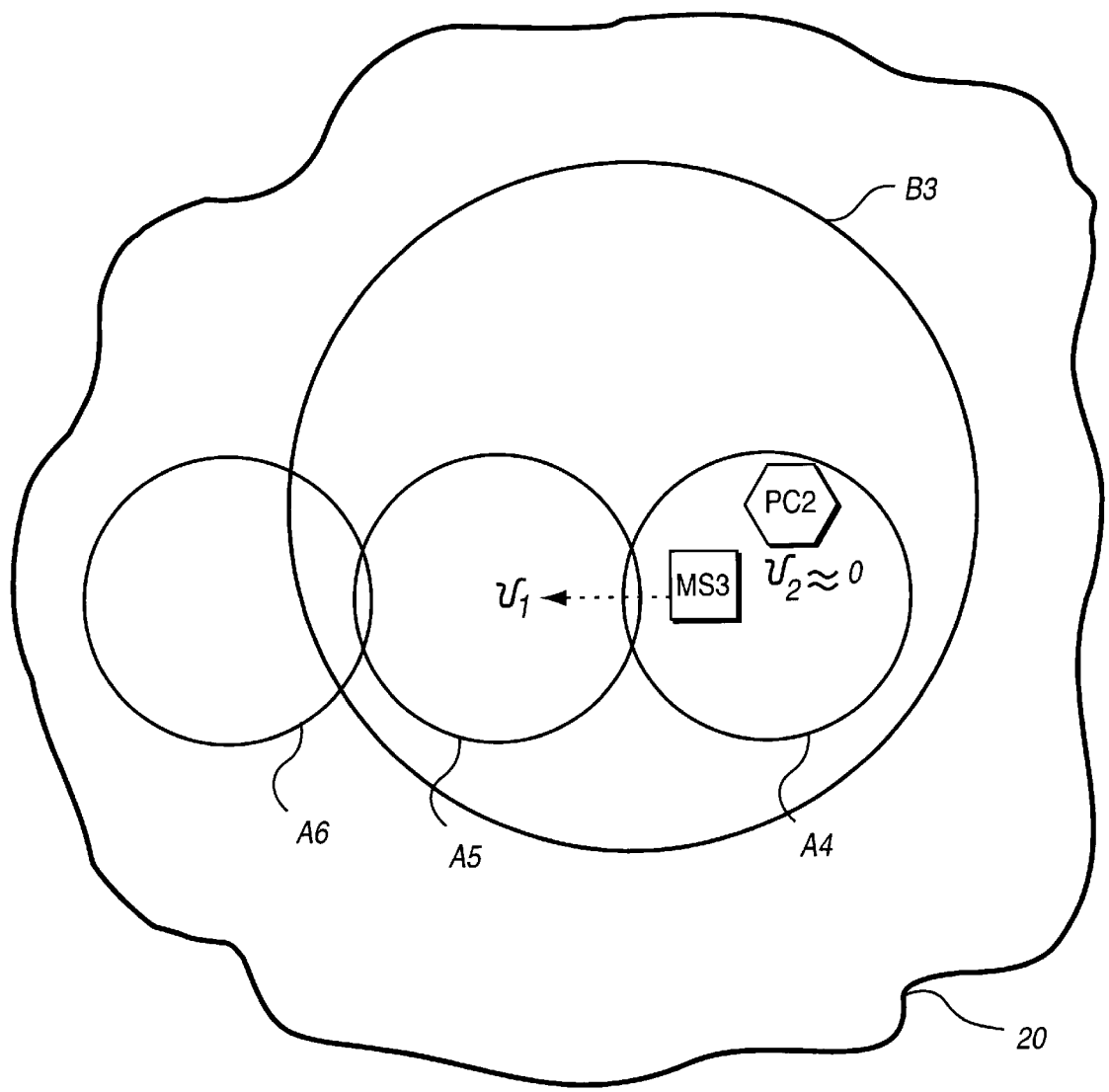
FIG. 6 is a schematic diagram of an example embodiment of the present invention.

The example of the present invention shown in FIG. 6 illustrates the movement characteristics of mobile stations and their relevance to the present invention. As shown in FIG. 6, the geographic area 20 has two cell levels. The first cell level has relatively small geographic cells, A4, A5, and A6. The second hierarchical cell level has one cell of relatively larger geographic size B3. In the geographic area 20, mobile station MS3 is located within cell A4 and cell B3 (since A4 and B3 are overlapping). In addition, a laptop computer PC2 is operating in the cellular system in its location within cell A4 and cell B3. Although it is not universally true, it is more probable that the mobile station MS3 will be moving within the geographic region 20 than that the laptop PC2 will be moving in the geographic area 20 during communication. Thus, the mobile station MS3 is shown with a velocity V1 moving from cell A4 towards cell A5, yet remaining within cell B3. The laptop PC2 (which when communicating on the cellular network is more likely to be still) is shown with velocity V2 approximately equal to zero within cell A4 and cell B3. The velocity of the different devices MS3 and PC2 is relevant since the transition of any mobile station from one cell into another will require a hand-off procedure. That is, if the mobile station MS3 is communicating with the base station of cell A4, the mobile station MS3 will require a handoff procedure from cell A4 to the base station servicing cell A5 as it moves from cell A4 to cell A5. On the other hand, if the mobile station MS3 is communicating with the base station servicing cell B3, the mobile station MS3 can move from the geographical area of cell A4 into the geographical area of cell A5 without requiring any handoff procedure since the cell B3 encompasses both cells A4 and A5. Accordingly, the mobile station MS3 will not require a hand-off procedure, if it is communicating with the base station of cell B3, until it leaves the relatively large cell B3.

The tradeoff of the mobile station MS3 communicating with the cell B3 as opposed to the cell A4 is the bandwidth available to it. Since the cell B3 is servicing a larger geographical area with generally the same traffic capacity as cell A4 (which is a smaller geographical area), it is less likely that a high bandwidth will be available to mobile station MS3 if it is communicating with the base station of cell B3 as opposed to the base station of cell A4.

This bandwidth availability is generally the concern of high bandwidth requirement devices, such as laptop PC2. Laptop PC2 will likely require higher bandwidth availability, preferably communicates with the base station of cell A4, where a higher bandwidth availability is more likely to exist than with the base station of cell B3.

With both the mobile station MS3 and the laptop PC2, when the mobile terminal originates a call, the terminal (MS3 or PC2) can choose a high level base station or a low level base station (corresponding to level 30, 31, or 32) based on the bandwidth required for the particular mobile terminal as well as the likelihood of mobility of the mobile terminal in the geographic area 20. The mobile terminal can thus choose either higher bandwidth availability or higher mobility without handoffs by selecting a high, medium, or low level cell layer. Once the mobile terminal makes the selection, it can initiate connection with a base station associated with that cell layer. If the network decides that the mobile terminal has made an inappropriate choice, the network can force the terminal to use another base station at another cell level, either by forcing a handover, or by rejecting the call at the first base station with a message to the terminal to try a different base station at another cell level. In addition, if a mobile terminal with high bandwidth requirements attempts to set up a call through a base station at a low hierarchical level and there is no capacity left in the cell for the low hierarchical level, the network can free capacity up for the high bandwidth mobile terminal by forcing presently active low-bandwidth mobile terminals in the cell to handover to base stations at higher hierarchical levels.

In an alternative network connection system, the mobile originating calls do not enable the mobile terminals to individually select cell hierarchical levels for their communications, but instead transmit their bandwidth requirements and likely mobility criteria to the network for the network to then determine at which cell level the mobile terminal call connection should be connected. Then, the network can communicate to the mobile terminal which base station (at an appropriate cell level) the mobile terminal should communicate with to connect the call. Thus, when the terminal has a high requirement for bandwidth (and is fixed or moving very slowly), the network will attempt to choose to route the mobile call (whether originating or terminating) via a base station belonging to a low hierarchical level (such as layer 30) in order to be able to offer a higher transportation capacity to the mobile terminal. On the other hand, when the terminal has a lower requirement on bandwidth (but is moving relatively quickly in the geographic area), the network can choose to route a mobile call (either originating or terminating) via a base station belonging to a higher hierarchical level in order to offer greater mobility to the mobile terminal without handoffs.

In accordance with the present invention, the following conditions should be valid:

Overlapping cells (such as A1, B1 and C1 in FIG. 2) must use different frequency bands;

Adjacent cells (such as C1 and C2 in FIG. 2) must use different frequency bands.

An additional useful feature that can be embodied in the present invention includes a possibility to change hierarchical cell levels for a currently-used connection during on going transmission session to one that is more appropriate to the recent traffic and roaming behavior of the Mobile Terminal. This requires that e.g., the network collects statistics on the recent behaviors of terminals in regard to their roaming and used bit rate.

Figure 4:
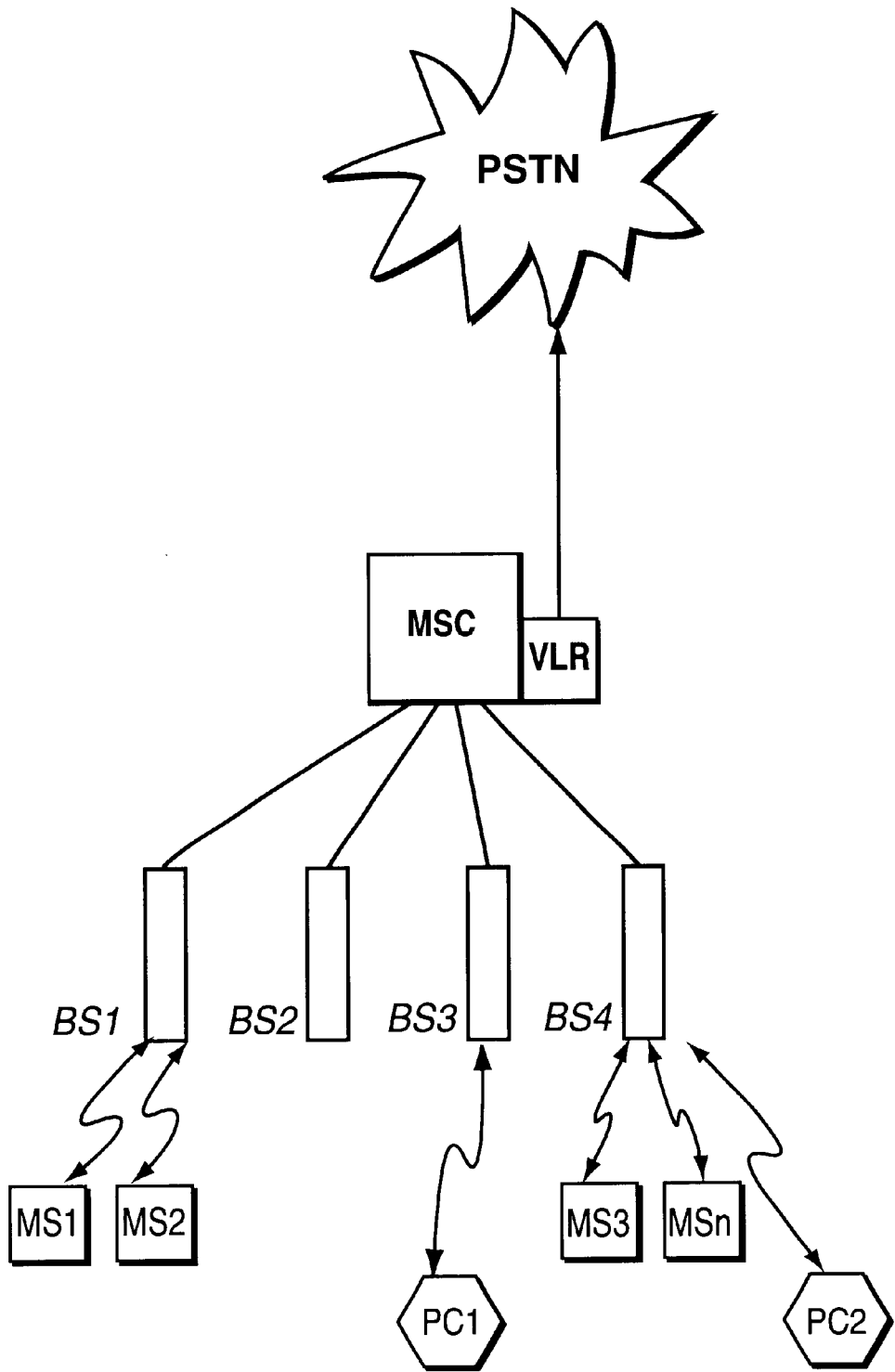
FIG. 4 is a prior art simplified schematic diagram of a mobile radio communication network.

FIG. 4 illustrates a general prior art mobile communications system into which the present invention can be incorporated in order to improve the system. In particular, the mobile system comprises mobile stations MS1, MS2, MS3, MSn communicating with base stations associated with the cells within which the respective mobile stations are located (the base stations are BS1, BS2, BS3, BS4, etc.). Of course, the example of FIG. 4 is simplified in that more mobile stations may be used per base station and more base stations may be employed per cellular communications system. In addition to the mobile stations MS1, MS2, MS3, MSn, additional mobile terminals such as computers PC1, PC2, etc., may be communicating by cellular communications to base stations BS1, BS2, BS3, and BS4. The base stations BS1, BS2, BS3, and BS4 include, as one of ordinary skill in the art will understand, base station controllers which communicate with the mobile services switching center (MSC). The MSC incorporates a visitor location register (VLR). This mobile services switching center (MSC/VLR) communicates with outside core networks such as the public switched telephone network (PSTN). In the present invention, the base stations BS1, BS2, BS3, BS4, etc. are arranged in order to form a cell structure shown. In accordance with the present invention, the base stations are arranged to form the cell structure shown in FIGS. 2 or 3 or a similar hierarchical cell structure in accordance with the teachings of the present invention. Then the mobile services switching center (MSC) places calls to the mobile terminals (MS1, MS2, MS3, MSn, PC1, and PC2) in accordance with the bandwidth requirements and mobility of the respective mobile terminals. In addition, for mobile originating calls, the mobile terminals (MS1, MS2, MS3, MSn, PC1, and PC2) choose base stations in accordance with the bandwidth requirements and mobility of the mobile terminals, all in accordance with the teachings of FIGS. 2, 3, 5, 6 and 7 of the present application. Of course, this is simply an example embodiment of the present invention and one of ordinary skill in the art will understand that modifications to the system components and elements may be incorporated while retaining the general features of the present invention of selecting communication with cells and various hierarchical cell levels in accordance with the bandwidth requirements and mobility of the mobile terminals.

Figure 7:
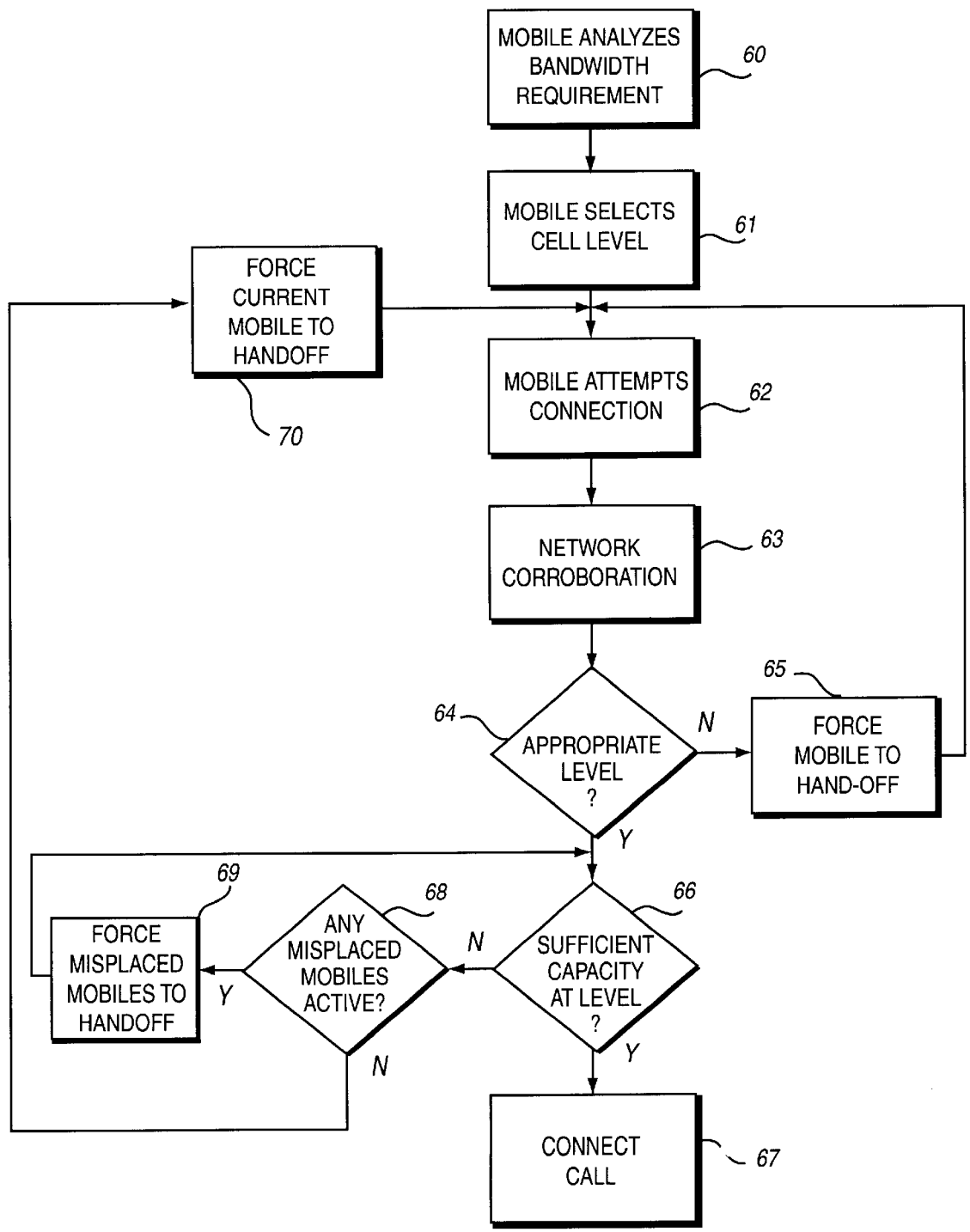
FIG. 7 is a flow diagram in accordance with an example embodiment of the present invention.

FIG. 7 illustrates a flow diagram of a mobile originated call in accordance with an example embodiment of the present invention. In FIG. 7, the mobile terminal analyzes its bandwidth requirement at step 60. Traditionally, this will mean that a mobile terminal involved in computing finctions (such as a laptop) will require higher bandwidths than a mobile terminal used for telephone conversation, although this will not always be the case. Based on that analysis of its bandwidth requirement, the mobile terminal will select a cell level, (for example, level 30, 31, or 32 of FIG. 3) at step 61. After selecting the cell level at step 61, the mobile terminal will attempt a connection to a corresponding base station for a cell in the cell level selected, at step 62. The network will then corroborate, at step 63, whether the mobile terminal has appropriately selected a cell level for which the connection attempt was made at step 62. If the mobile terminal has selected and attempted to connect to an appropriate cell level at step 64, the process will proceed to step 66. If not, the process will proceed to step 65 where the network forces the mobile terminal to handoff to a base station of a cell of a different level. This will happen, for example, when a mobile terminal can employ a smaller bandwidth, yet requests a cell level having a higher bandwidth capability. In such a case, the network will force the mobile terminal to handoff to a cell level having lower bandwidth availability at step 65. The process will then return to step 62 where the mobile terminal will attempt connection at the new cell level dictated by the network at step 65.

If the mobile terminal has attempted connection to an appropriate cell level at step 64, the network then determines whether sufficient traffic capacity is available in the cell at the cell level selected by the mobile terminal at step 61. If sufficient capacity is available for the mobile terminal at the bandwidth requirement determined at step 60, then at step 66, the determination will be "yes" and the network will connect the call at step 67. If, on the other hand, insufficient capacity is available at the cell level requested by the mobile terminal at step 62, the process goes to step 68 where the network inquires as to whether any mobile terminals are involved in active calls in the cell at inappropriate cell levels determined in step 64. That is, at step 68, the network analyzes the active calls in the cell of the cell layer in which the mobile terminal wishes to make connection at step 62 by, for example, determining whether mobile terminals active in the cell are lower bandwidth-required devices operating in a higher-bandwidth available cell layer. If any mobile terminals at step 68 can be moved to a lower bandwidth-available cell in order to make traffic capacity available for the mobile attempting connection at step 62, the network will force the misplaced mobile terminals to handoff to cells of higher hierarchical levels at step 69.

Then, the process returns to step 66 where the network again determines whether traffic capacity is available in the cell now that the misplaced mobile telephones have been forced to handoff to higher level cell layers in steps 68 and 69. If sufficient capacity is available at step 66, the call is connected through at step 67. If, on the other hand, sufficient capacity is still not available at step 66 and no additional mobile terminals can be moved to higher level cell layers at steps 68 and 69, the process proceeds to step 70 where the network conforms the current mobile terminal that it must handoff to a different cell layer (usually a lower bandwidth-available cell layer) than the mobile terminal would desire, at step 70. This will allow the mobile terminal to then make connection at step 62 although the connection will be made at a higher cell layer than the mobile terminal normally desires (thus, for example, slowing communications for the mobile terminal).

If, on the other hand, the call originates from a core network and is to terminate at a mobile terminal, the network inquires as to the bandwidth requirement for the mobile terminal. This, for example, will take the place of step 60 in FIG. 7. The following then, is a fairly detailed description of how the cell level for a connection is then chosen in the hierarchical cellular system once the bandwidth requirement for the mobile terminal is determined for a core originating and mobile terminal terminating call. First, the required bandwidth for the connection will be sent to the access network in a negotiation procedure preceding the actual connection set-up procedure. The RNC node (FIG. 5) in the access network is the communication party in the negotiation procedure and will control which cell level will be ultimately used by the connection. At connection set-up, the access network will get the required bandwidth for the connection from the mobile terminal (or from a look-up table or the like). If there is a terminal-originated connection set-up, the terminal can choose the level for the connection in the cell hierarchy. As described with respect to FIG. 7, if the network finds another level more appropriate for the connection, the network can order a frequency handover to an appropriate cell level. If, on the other hand, the connection set-up is terminal terminated, the required bandwidth is sent from the core network to the access network at connection set-up. This bandwidth requirement for the connection can be in the form of a minimum level that is acceptable for the connection. One way that this bandwidth requirement can be sent to the access network in a GSM environment (as an example) is shown below.

For Terminal Originated Calls

Step 1: Ask for a signaling channel, on the random access channel;

Step 2: Inform the terminal on an access grant channel from the network which signaling channel is available for its use; and Step 3: Have the mobile terminal send a connection set-up message on the dedicated control channel, which message includes a bandwidth requirement for the connection.

The above procedure is relevant to the standardization of GSM cellular networks and an analogous procedure will be known to those of ordinary skill in the art in employing the present invention in non-GSM procedures.

For Terminal Terminated Calls

For terminal-terminated calls, the following procedure can be employed for connection-setup:

Step 1: Send a page request on the page channel, which request includes the bandwidth requirement for the connection;

Step 2: Request a dedicated signaling channel on the random access channel;

Step 3: Get a signaling channel, answer on an access grant channel;

Step 4: Get a page response from the mobile terminal on the dedicated signaling channel; and Step 5: Send a connection set-up message to the network from the mobile terminal.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A cellular telecommunications system for mobile radios, the system servicing a defined geographic area of a first layer of cells defined by first layer base stations, each of said first layer cells having associated relatively smaller geographic coverage areas; and a second layer of cells defined by second layer base stations, each of said second layer cells having associated relatively larger geographic coverage areas; said first and second layers of cells generally overlapping; the system comprising:

a mobile radio access node coordinating call connections between said mobile radios and said first and second layers of base stations in accordance with minimum bandwidth requirements of said call connections such that preference for said second layer base stations is given to call connections having lower minimum bandwidth requirements and preference for said first layer base stations is given to call connections having higher minimum bandwidth requirements.

2. A system according to claim 1, wherein preference for said second layer base stations is given to call connections to more mobile ones of said mobile terminals and preference for said first layer base stations is given to call connections to more stationary ones of said mobile terminals.

3. A system according to claim 1, wherein:

the plurality of mobile radios include cellular telephone and cellular computers and wherein the mobile radio access node coordinates call connections to the cellular telephones by giving preference to said second layer base stations and coordinates call connections to the cellular computers by giving preference to said first layer base stations.

4. A system according to claim 1, wherein the mobile radio access node further includes an input to receive call requests including information defining said minimum bandwidth requirements for said call requests.

5. A system according to claim 4, wherein the input receives said call requests from said mobile radios.

6. A system according to claim 4, further including a core network in communication with the radio access node, and wherein the input receives said call requests from the core network.

7. A method of connecting a cellular call originating from a mobile radio within a cellular system including first layer base stations coordinating cellular communication in relatively small geographic cells and including second layer base stations coordinating cellular communication in relatively large geographic cells overlapping said relatively small geographic cells, the method comprising the steps of:

determining a minimum bandwidth requirement for the cellular call;

attempting to connect the call to a first layer base station if said minimum bandwidth is relatively high compared to a traffic handling characteristic of the second layer base stations; and attempting to connect the call to a second layer base station if said minimum bandwidth is relatively low compared to a traffic handling characteristic of the first layer base stations.

8. A method according to claim 7, wherein:

the mobile radio originating the call performs the step of determining.

9. A method according to claim 8, wherein:

the mobile radio originating the call selects, in a preliminary decision, whether to connect a call via a first layer base station or via a second layer base station, based on the minimum bandwidth determination, and the cellular system analyzes the propriety of the preliminary decision.

10. A method according to claim 8, wherein:

if the cellular system corroborates the preliminary decision, the mobile radio connects to a base station of the selected layer, and if the cellular system rejects the preliminary decision, the mobile radio connects to a base station of an unselected layer.

11. A method according to claim 7, further including the steps of:

redirecting traffic from first layer base stations to said second layer base stations when said call connect is attempted to a first layer base station.

12. A method according to claim 11, wherein:

the redirected traffic is associated with prior call connections of relatively low minimum bandwidth compared to a traffic handling characteristic of the first layer base stations.

13. A method according to claim 12, wherein:

the redirected traffic is associated with cellular telephone call connections.

14. A method according to claim 7, further including the steps of:

redirecting traffic from second layer base stations to said first layer base stations when said call connect is attempted to a second layer base station.

15. A method according to claim 14, wherein:

the redirected traffic is associated with prior call connections of relatively low minimum bandwidth compared to a traffic handling characteristic of the first layer base stations.

16. A method according to claim 15, wherein:

the redirected traffic is associated with cellular computer call connections.

* * * * *